(12) United States Patent
Abir

(10) Patent No.: US 7,483,828 B2
(45) Date of Patent: Jan. 27, 2009

(54) MULTILINGUAL DATABASE CREATION SYSTEM AND METHOD

(75) Inventor: Eli Abir, Cross River, NY (US)

(73) Assignee: Meaningful Machines, L.L.C., New York, NY (US)

( * ) Notice: Subject to any disclaimer, the term of this patent is extended or adjusted under 35 U.S.C. 154(b) by 65 days.

(21) Appl. No.: 10/194,322

(22) Filed: Jul. 15, 2002

(65) Prior Publication Data

US 2003/0139920 A1 Jul. 24, 2003

Related U.S. Application Data

(63) Continuation-in-part of application No. 10/024,473, filed on Dec. 21, 2001, now abandoned.

(60) Provisional application No. 60/299,472, filed on Jun. 21, 2001, provisional application No. 60/276,107, filed on Mar. 16, 2001.

(51) Int. Cl.
*G06F 17/20* (2006.01)

(52) U.S. Cl. .......................................................... 704/8

(58) Field of Classification Search ................ 704/2, 704/3, 4, 5, 6–7, 8; 717/136, 137; 715/536, 715/264

See application file for complete search history.

(56) References Cited

U.S. PATENT DOCUMENTS

| | | | |
|---|---|---|---|
| 5,146,406 A | 9/1992 | Jensen | |
| 5,227,971 A * | 7/1993 | Nakajima et al. | ............... 704/2 |
| 5,237,503 A | 8/1993 | Bedecarrax et al. | |
| 5,369,575 A | 11/1994 | Lamberti et al. | |
| 5,377,103 A | 12/1994 | Lamberti et al. | |
| 5,523,946 A * | 6/1996 | Kaplan et al. | ................... 704/2 |
| 5,541,837 A * | 7/1996 | Fushimoto | ..................... 704/2 |
| 5,579,224 A | 11/1996 | Hirakawa et al. | |
| 5,630,121 A | 5/1997 | Braden-Harder et al. | |
| 5,659,765 A | 8/1997 | Nii | |
| 5,724,593 A | 3/1998 | Hargrave | |
| 5,742,505 A * | 4/1998 | Fushimoto et al. | ............. 704/2 |
| 5,799,268 A | 8/1998 | Boguraev | |
| 5,867,811 A | 2/1999 | O'Donoghue | |
| 5,873,055 A * | 2/1999 | Okunishi | ....................... 704/2 |
| 5,991,710 A | 11/1999 | Papineni et al. | |
| 6,081,775 A | 6/2000 | Dolan | |
| 6,085,162 A | 7/2000 | Cherny | |
| 6,163,785 A * | 12/2000 | Carbonell et al. | .............. 704/2 |
| 6,253,170 B1 | 6/2001 | Dolan | |

(Continued)

*Primary Examiner*—Patrick N. Edouard
*Assistant Examiner*—Lamont Spooner
(74) *Attorney, Agent, or Firm*—Crowell & Moring LLP

(57) ABSTRACT

A method and apparatus for translating a document segment in a first language into a document segment in a second language. A document segment can be text in the form of words or phrases in a document. The invention can be used where there is insufficient information to directly translate the document in the first language into the document in the second language. The invention includes providing an association between the document segment in the first language and a document segment in each of a plurality of third languages, providing an association between sample segments in the second language each of which corresponds to a segment in each of the plurality of third languages, identifying at least two sample segments that are identical as a deduced association segment; and associating the deduced association segment with the document segment in the first language.

10 Claims, 1 Drawing Sheet

CROSS-IDEA DATABASE

| 1 | 2 | 3 | 4 |
|---|---|---|---|
| System A Segments | System B Segments by Rank of Frequency after subtraction | Direct Frequencies | Frequencies after subtraction |
| Da1 | Db1+Db3+Db4 | 25 | 25 |
| Da1 | Db9+Db10 | 19 | 19 |
| Da1 | Db1 | 35 | 10 |
| Da1 | Db1+Db3 | 30 | 5 |
| Da2 | Db2+Db6 | 20 | 20 |
| Da2 | Db12 | 15 | 15 |
| Da2 | Db2 | 25 | 5 |
| Da3+Da4 | Db5+Db7 | 15 | 15 |
| Da3+Da4 | Db5 | 25 | 10 |

U.S. PATENT DOCUMENTS

| | | | |
|---|---|---|---|
| 6,275,789 B1 * | 8/2001 | Moser et al. | 704/7 |
| 6,285,978 B1 | 9/2001 | Bernth et al. | |
| 6,321,189 B1 | 11/2001 | Masuichi et al. | |
| 6,321,191 B1 * | 11/2001 | Kurahashi | 704/8 |
| 6,330,530 B1 | 12/2001 | Horiguchi et al. | |
| 6,349,276 B1 * | 2/2002 | McCarley | 704/8 |
| 6,370,498 B1 * | 4/2002 | Flores et al. | 704/3 |
| 6,393,389 B1 | 5/2002 | Chanod et al. | |
| 2002/0116176 A1 | 8/2002 | Tsourikou et al. | |

* cited by examiner

| CROSS-IDEA DATABASE | | | |
| --- | --- | --- | --- |
| 1 | 2 | 3 | 4 |
| System A Segments | System B Segments by Rank of Frequency after subtraction | Direct Frequencies | Frequencies after subtraction |
| Da1 | Db1+Db3+Db4 | 25 | 25 |
| Da1 | Db9+Db10 | 19 | 19 |
| Da1 | Db1 | 35 | 10 |
| Da1 | Db1+Db3 | 30 | 5 |
| Da2 | Db2+Db6 | 20 | 20 |
| Da2 | Db12 | 15 | 15 |
| Da2 | Db2 | 25 | 5 |
| Da3+Da4 | Db5+Db7 | 15 | 15 |
| Da3+Da4 | Db5 | 25 | 10 |

Figure 1

MULTILINGUAL DATABASE CREATION SYSTEM AND METHOD

RELATED APPLICATIONS

This application is a continuation-in-part of U.S. application Ser. No. 10/024,473, filed Dec. 21, 2001 now abandoned and claims the benefit of U.S. Provisional Application No. 60/276,107 filed Mar. 16, 2001, and U.S. Provisional Application No. 60/299,472 filed Jun. 21, 2001, all of which are hereby incorporated by reference.

FIELD OF THE INVENTION

This invention relates to a method and apparatus for creating a multilingual database that may be used to convert content from on state to a second state.

BACKGROUND

Devices and methods for automatically translating documents from one language to another are known. However, these devices and methods often fail to accurately translate documents from one language to another, can consume large amounts of time and can be inconvenient to use. In addition to human-based translators, other known devices include commercially available machine translation software. These known systems have flaws that render them susceptible to errors, slow speed and inconvenience. Known translation devices and methods cannot consistently return accurate translations for text input and therefore frequently require intensive user intervention for proof reading and editing. Accurate machine translation is more complicated than providing devices and methods that make word-for-word translations of documents. In these word-for-word systems, the translation often times makes little sense to readers of the translated document, as the word-for-word method results in wrong word choices and incoherent grammatical units.

To overcome these deficiencies, known translation devices have for decades attempted to make choices of word translations within the context of a sentence based on a combination or set of lexical, morphological, syntactic and semantic rules. These systems, known in the art as "Rule-Based" machine translation (MT) systems are flawed because there are so many exceptions to the rules that they cannot provide consistently accurate translation.

In addition to Rule-Based MT, in the last decade a new method for MT known as "example-based" (EBMT) has been developed. EBMT makes use of sentences (or possibly portions of sentences) stored in two different languages in a cross-language database. When a translation query matches a sentence in the database, the translation of the sentence in the target language is produced by the database providing an accurate translation in the second language. If a portion of a translation query matches a portion of a sentence in the database, these devices attempt to accurately determine which portion of the sentence mapped to the source language sentence is the translation of the query.

EBMT systems cannot provide accurate translation of a broad language because the databases of cross-language sentences are built manually and will always be predominantly "incomplete" Another flaw of EBMT systems is that partial matches are not reliably translated. Attempts have been made to automate the creation of cross-language databases using pairs of translated documents for use in EBMT. However, these efforts have not been successful in creating meaningful, accurate cross-language databases of any significant size. None of these attempts use an algorithm that reliably and accurately distill the translations of a significant number of words and word-strings from a pair of translated documents.

Some translation devices combine both Rule-Based and EBMT engines. Although this combination of approaches may yield a higher rate of accuracy than either system alone, the results remain inadequate for use without significant user intervention and editing.

The problems faced when attempting to translate documents from one language to another can apply more generally to the problem of converting data representing ideas or information from one state, say words, into data representing the ideas in another state, for example, mathematical symbols. In such cases cross-idea association databases that associate data in one state with equivalent data in the second state must be consulted. Therefore, a need exists for an improved and more efficient method and apparatus for creating dictionaries or databases that associate equivalent ideas in different languages or states, (e.g., words, word-strings, sounds, movement and the like) and for translating or converting ideas conveyed by documents in one language or state into the same or similar ideas represented by documents in a second language or state.

The invention relates to manipulating content using a cross-idea association database. In particular, the present invention provides a method and apparatus for creating a database of associated ideas and provides a method and apparatus for utilizing that database to convert ideas from one state into other states.

In one embodiment, and by example, the present invention provides a method and apparatus for creating a language translation database, where two languages form the database of associated ideas. The present invention also provides a method and apparatus for utilizing that language database to convert documents (representing ideas) from one language to another (or more generally, from one state to another). However, the present invention is not limited to language translation, although that preferred embodiment will be presented. The database creation aspect of the present invention may be applied to any ideas that are related in some manner but expressed in different states and the conversion aspect of the present invention may be applied to accurately translate ideas from one state to another.

The application of the present invention to a language translation embodiment will now be described. As used herein, the terms related to converting, translating, and manipulating are used interchangeably and in their broadest sense.

SUMMARY OF THE INVENTION

One object of the present invention is to facilitate the efficient translation of documents from one language or state to another language or state by providing a method and apparatus for creating and supplementing cross-idea association databases. These databases generally associate data in a first form or state that represents particular ideas or pieces of information with data in a second form or state that represents the same ideas or pieces of information.

Another object of the present invention is to facilitate the translation of documents from one language or state to another language or state by providing a method and apparatus for creating a second document comprising data in a second state, form, or language, from a first document comprising data in a first state, form, or language, with the result that the first and second documents represent substantially the same ideas or information.

Yet another object of the present invention is to facilitate the translation of documents from one language or state to another language or state by providing a method and apparatus for creating a second document comprising data in a second state, form, or language, from a first document comprising data in a first state, form, or language, with the result that the first and second documents represent substantially the same ideas or information, and wherein the method and apparatus includes using a cross-idea association database.

Yet another object of the present invention is to provide the translation of documents (in a broad sense, the conversion of ideas from one state to another state) in a real-time manner.

The present invention achieves these and other objects by providing a method and apparatus for creating a cross-idea database. The method and apparatus for creating the cross-idea database can include providing one or more pair of documents in two (or more) different languages representing the same general text (i.e., exact translations of text ("Parallel Text") or generally related text ("Comparable Text")). The present invention selects at least a first and a second occurrence of all words and word strings that have a plurality of occurrences in the first language in the available cross-language documents. It then selects at least a first word range and a second word range in the second language documents, wherein the first and second word ranges correspond to the first and second occurrences of the selected word or word-string in the first language documents. Next, it compares words and word-strings found in the first word range with words and word strings found in the second word range and, locating words and word-strings common to both word ranges, and stores those located common words and word strings in the cross-idea database. The invention then associates in said cross-idea database located common words or word strings in the two ranges in the second language with the selected word or word string in the first language, ranked by their association frequency (number of recurrences), after adjusting the association frequencies as detailed herein. By testing common word and word-strings across languages in Parallel or Comparable Texts, the database will resolve more associations as more Parallel or Comparable Text becomes available in a variety of different languages.

The present invention also achieves these and other objectives by providing a method and apparatus for converting a document from one state to another state. The present invention provides a database comprised of data segments in a first language associated with data segments in a second language (created through methods described above or manually). The present invention translates text by accessing the above-referenced database, and identifying the longest word string in the document to be translated (measured by number of words) beginning with the first word of the document, that exists in the database. The system then retrieves from the database a word string in the second language associated with the located word string from the document in the first language. The system then selects a second word string in the document that exists in the database and has an overlapping word (or alternatively word string) with the previously identified word string in the document, and retrieves from the database a word string in the second language associated with the second word string in the first language. If the word string associations in the second language have an overlapping word (or alternatively words) the word string associations in the second language are combined (eliminating redundancies in the overlap) to form a translation; if not, other second language associations to the first language word strings are retrieved and tested for combination through an overlap of words until successful. The next word string in the document in first language is selected by finding the longest word string in the database that has an overlapping word (or alternatively words) with the previously identified first language word string, and the above process continued until the entire first language document is translated into a second language document.

BRIEF DESCRIPTION OF THE FIGURES

FIG. 1 shows an embodiment of a cross-idea database according to the present invention.

DETAILED DESCRIPTION OF THE INVENTION

The present invention provides a method and apparatus for creating and supplementing a cross-idea database and for translating documents from a first language or state into a second language or state using a cross-idea database. Documents as discussed herein are collections of information as ideas that are represented by symbols and characters fixed in some medium. For example, the documents can be electronic documents stored on magnetic or optical media, or paper documents, such as books. The symbols and characters contained in documents represent ideas and information expressed using one or more systems of expression intended to be understood by users of the documents. The present invention manipulates documents in a first state, i.e., containing information expressed in one system of expression, to produce documents in a second state, i.e., containing substantially the same information expressed using a second system of expression. Thus, the present invention can manipulate or translate documents between systems of expression, for example, written and spoken languages such as English, Hebrew, and Cantonese, into other languages.

A detailed description of the present invention, including the database creation method and apparatus, and the conversion method and apparatus, will now be described.

1. Database Creation Method and Apparatus a. Overview

The method of the present invention makes use of a cross-idea database for document content manipulation. FIG. 1 depicts an embodiment of a cross-idea database. This embodiment of a cross-idea database comprises a listing of associated data segments in columns 1 and 2. The data segments are symbols or groupings of characters that represent a particular idea or piece of information in a system of expression. Thus, System A Segments in column 1 are data segments that represent various ideas and combination of ideas Da1, Da2, Da3 and Da4 in a hypothetical system of expression A. System B Segments in column 2 are data segments Db1, Db3, Db4, Db5, Db7, Db9, Db10 and Db12, that represent various ideas and some of the combinations of those ideas in a hypothetical system of expression B that are ordered by association frequency with data segments in system of expression A. Column 3 shows the Direct Frequency, which is the number of times the segment or segments in language B were associated with the listed segment (or segments) in language A. Column 4 shows the Frequencies after Subtraction, which represents the number of times a data segment (or segments) in language B has been associated with a segment (or segments) in language A after subtracting the number of times that segment (or segments) has been associated as part of a larger segment, as described more fully later.

As shown in FIG. 1, it is possible that a single segment, say Da1 is most appropriately associated with multiple segments, Db1 together with Db3 and Db4. The higher the Frequencies after Subtraction (as described herein) between data segments, the higher the probability that a system A segment is equivalent to a system B segment. In addition to measuring adjusted frequencies by total number of occurrences, the adjusted frequencies can also be measured, for example, by calculating the percentage of time that particular system A segments have corresponded to a particular system B segments. When the database is used to translate a document, the highest ranked associated segment will be retrieved from the database first in the process. Often, however, the method used to test the combination of associated segments for translation (as described later) determines that a different, lower ranked association should be tested because the higher ranked association, once tested, can not be used. For example, if the database was queried for an association for Da1, it would return Db1+Db3+Db4; if Db1+Db3+Db4 could not be used as determined by the process that accurately combines data segments for translation, the database would then return Db9+Db10 to test for accurate combination with another associated segment, for translation.

In general, the method for creating a cross-idea database of the present invention includes examining and operating on Parallel or Comparable Text. The method and apparatus of the present invention is utilized such that a database is created with associations across the two states—accurate conversions, or more specifically, associations between ideas as expressed in one state and ideas as expressed in another. The translation and other relevant associations between the two states become stronger, i.e. more frequent, as more documents are examined and operated on by the present invention, such that by operation on a large enough "sample" of documents the most common (and, in one sense, the correct) association becomes apparent and the method and apparatus can be utilized for conversion purposes.

In one embodiment of the present invention, the two states represent word languages (e.g., English, Hebrew, Chinese, etc.) such that the present invention creates a cross-language database correlating words and word-strings in one language to their translation counterparts in a second language. Word-strings may be defined as groups of consecutive adjacent words and often include punctuation and any other mark used in the expression of language. In this example, the present invention creates a database by examining documents in the two languages and creating a database of translations for each recurring word or word string in both languages. However, the present invention need not be limited to language translation. The present invention allows a user to create a database of ideas and associate those ideas to other, differing ideas in a hierarchical manner. Thus, ideas are associated with other ideas and rated according to the frequency of the occurrence. The specific weight given to the occurrence frequency, and the use applied to the database thus created, can vary depending upon the user's requirements.

For example, in the context of converting text from one language to another the present invention will operate to create language translations of words and word strings between the English and Chinese languages. The present invention will return a ranking of associations between words and word-strings across the two languages. Given a large enough sample size, the word or word-string occurring the most often will be one of the Chinese equivalents of the English word or word-string. However, the present invention will also return other Chinese language associations for the English words or word-strings, and the user may manipulate those associations as desired. For example, the word "mountain," when operated on according to the present invention may return a list of Chinese language words and word strings in the language being examined. The Chinese language equivalents of the word "mountain" will most likely be ranked the highest; however, the present invention will return other foreign language words or word-strings associated with "mountain," such as "snow", "ski", "a dangerous sport", "the highest point in the world", or "Mt. Everest." These words and word-strings, which will likely be ranked lower than the translations of "mountain," can be manipulated as desired by the user. Thus, the present invention is an automated association database creator. The strongest associations represent "translations" or "conversions" in one sense, but other frequent (but weaker) associations represent ideas that are closely related to the idea being examined. The databases can therefore, be used by systems using artificial intelligence applications that are well known in the art. Those systems currently use incomplete, manually created idea databases or ontologies as "neural networks" for applications.

Another embodiment of the present invention utilizes a computing device such as a personal computer system of the type readily available in the prior art. Although the computing device is typically a common personal computer (either stand-alone or in a networked environment), other computing devices such as PDA's, wireless devices, servers, mainframes, and the like are similarly contemplated. However, the method and apparatus of the present invention does not need to use such a computing device and can readily be accomplished by other means, including manual creation of the cross-associations. The method by which successive documents are examined to enlarge the "sample" of documents and create the cross-association database is varied—the documents can be set up for analysis and manipulation manually, by automatic feeding (such as automatic paper loaders as known in the prior art), or by using search techniques on the Internet to automatically seek out the related documents such as Web Crawlers.

Note that the present invention can produce an associated database by examining Comparable Text, in addition to (or even instead of) Parallel Text. Furthermore, the method looks at all available documents collectively when searching for a recurring word or word-string within a language.

b. Building the Database

According to the present invention, the documents are examined for the purpose of building the database. After document input (again, of a pair of documents representing the same text in two different languages), the creation process begins using the methods and/or apparatus described herein.

For illustrative purposes, assume that the documents contain the same content (or, in a general sense, idea) in two different languages. Document A is in language A, Document B is in language B. The documents have the following text:

| Document A (language A) | Document B (language B) |
| --- | --- |
| X Y Z X W V Y Z X Z | AA BB CC AA EE FF GG CC |

The first step in the present invention is to calculate a word range to determine the approximate location of possible associations for any given word or word string. Since a cross-language word-to-word analysis alone will not yield productive results (i.e., word 1 in document A will often not exist as the literal translation of word 1 in document B), and the sentence structure of one language may have an equivalent idea in a different location (or order) of a sentence than another language, the database creation technique of the present invention associates each word or word-string in the first language with all of the words and word strings found in a selected range in the second language document. This is also important because one language often expresses ideas in longer or shorter word strings than another language. The range is determined by examining the two documents, and is used to compare the words and word-strings in the second document against the words and word-strings in the first document. That is, a range of words or word-strings in the second document is examined as possible associations for each word and word string in the first document. By testing against a range, the database creation technique establishes a number of second language words or word-strings that may equate and translate to the first language words and word-strings.

There are two attributes that must be determined in order to establish the range in the second language document in which to look for associations for any given word or word string in the first language document. The first attribute is the value or size of the range in the second document, measured by the number of words in the range. The second attribute is the location of the range in the second document, measured by the placement of the mid-point of the range. Both attributes are user defined, but examples of preferred embodiments are offered below. In defining the size and location of the range, the goal is to insure a high probability that the second language word or word-string translation of the first language segment being analyzed will be included.

Various techniques can be used to determine the size or value of the range including common statistical techniques such as the derivation of a bell curve based on the number of words in a document. With a statistical technique such as a bell curve, the range at the beginning and end of the document will be smaller than the range in the middle of the document. A bell-shaped frequency for the range allows reasonable chance of extrapolation of the translation whether it is derived according to the absolute number of words in a document or according to a certain percentage of words in a document. Other methods to calculate the range exist, such as a "step" technique where the range exists at one level for a certain percentage of words, a second higher level for another percentage of words, and a third level equal to the first level for the last percentage of words. Again, all range attributes can be user defined or established according to other possible parameters with the goal of capturing useful associations for the word or word string being analyzed in the first language.

The location of the range within the second language document may depend on a comparison between the number of words in the two documents. What qualifies as a document for range location purposes is user defined and is exemplified by news articles, book chapters, and any other discretely identifiable units of content, made up of multiple data segments. If the word count of the two documents is roughly equal, the location of the range in the second language will roughly coincide with the location of the word or word-string being analyzed in the first language. If the number of the words in the two documents is not equal, then a ratio may be used to correctly position the location of the range. For example, if document A has 50 words and document B has 100 words, the ratio between the two documents is 1:2. The mid-point of document A is word position 25. If word 25 in document A is being analyzed, however, using this mid-point (word position 25) as the placement of the midpoint of the range in document B is not effective, since this position (word position 25) is not the midpoint of document B. Instead, the midpoint of the range in document B for analysis of word 25 in document A may be determined by the ratio of words between the two documents (i.e., 25×2/1=50), by manual placement in the mid-point of document B or by other techniques.

By looking at the position of a word or word-string in the document and noting all the word or word strings that fall within the range as described above, the database creation technique of the present invention returns a possible set of words or word-strings in the second-language document that may translate to each word or word-string in the first document being analyzed. As the database creation technique of the present invention is utilized, the set of words and word strings that qualify as possible translations will be narrowed as association frequencies develop. Thus, after examining a pair of documents, the present invention will create association frequencies for words and word strings in one language with words or word strings in a second language. After a number of document pairs are examined according to the present invention (and thus a large sample created), the cross-language association database creation technique will return higher and higher association frequencies for any one word or word string. After a large enough sample, the highest association frequencies result in possible translations; of course, the ultimate point where the association frequency is deemed to be an accurate translation is user defined and subject to other interpretive translation techniques (such as those described in Provisional Application No. 60/276,107, entitled "Method and Apparatus for Content Manipulation" filed on Mar. 16, 2001 and incorporated herein by reference).

As indicated above, the invention tests not only words but also strings of words (multiple words). As mentioned, word strings include all punctuation and other marks as they occur. After a single word in a first language is analyzed, the database creation technique of the present invention analyzes a two-word word string, then three-word word string, and so on in an incremental manner. This technique makes possible the translation of words or word strings in one language that translate into a shorter or longer word-string (or word) in another language, as often occurs. If a word or word-string only occurs once in all available documents in the first language, the process immediately proceeds to analyze the next word or word string, where the analysis cycle occurs again. The analysis stops when all word or word strings that have multiple occurrences in the first language in all available Parallel and Comparable Text have been analyzed.

In a sense, any number of documents are aggregated and can be treated as one single document for purposes of looking for reoccurrences of words or word strings. In essence, for a word or word-string not to repeat it would have to occur only once in all available Parallel and Comparable Text. In addition, as another embodiment it is possible to examine the range corresponding to every word and word string regardless of whether or not it occurs more than once in all available Comparable and Parallel Text. As another embodiment, the database can be built by resolving specific words and word strings that are part of a query. When words and word strings are entered for translation, the present invention can look for multiple occurrences of the words or word-strings in cross-language documents stored in memory that have not yet been analyzed, by locating cross-language text on the Internet using web-crawlers and other devices and, finally, by asking the user to supply a missing association based on the analysis of the query and the lack of sufficiently available cross-language material.

The present invention thus operates in such a manner so as to analyze word strings that depend on the correct positioning of words (in that word string), and can operate in such a manner so as to account for context of word choice as well as grammatical idiosyncrasies such as phrasing, style, or abbreviations. These word string associations are also useful for the double overlap translation technique that provides the translation process as described herein.

It is important to note, that the present invention can accommodate situations where a subset word or word string of a larger word string is consistently returned as an association for the larger word string. The present invention accounts for these patterns by manipulating the frequency return. For example, proper names are sometimes presented complete (as in "John Doe"), abbreviated by first or surname ("John" or "Doe"), or abbreviated by another manner ("Mr. Doe"). Since the present invention will most likely return more individual word returns than word string returns (i.e., more returns for the first or surnames rather than the full name word string "John Doe"), because the words that make up a word string will necessarily be counted individually as well as part of the phrase, a mechanism to change the ranking should be utilized. For example, in any document the name "John Doe" might occur one hundred times, while "John" by itself or as part of John Doe might occur one hundred-twenty times, and "Doe" by itself or as part of John Doe might occur one hundred-ten times. The normal translation return (according to the present invention) will rank "John" higher than "Doe," and both of those words higher than the word string "John Doe"—all when attempting to analyze the word string "John Doe." By subtracting the number of occurrences of the larger word string from the occurrences of the subset (or individual returns) the proper ordering may be accomplished (although, of course, other methods may be utilized to obtain a similar result). Thus, subtracting one hundred (the number of occurrences for "John Doe"), from one hundred twenty (the number of occurrences for the word "John"), the corrected return for "John" is twenty. Applying this analysis yields one-hundred as the number of occurrences for the word string "John Doe" (when analyzing and attempting to translate this word string), twenty for the word "John," and ten for the word string "Doe," thus creating the proper associations.

Note that this issue is not limited to proper names and often occurs in common phrases and in many different contexts. For example, every time the word-string "I love you" is translated to its most frequent word-string association in another language, the word for "love" in that other language may be associated independently each of those times as well. Additionally, when the word-string is translated differently in other text that is analyzed, the word "love" may again be associated. This will skew the analysis and return the word "love" in the second language instead of "I love you" in the second language for the translation of "I love you" in the first language. Therefore, once again, the system subtracts the number of occurrences of the larger word-string association, from the frequency of all subset associations when ranking associations for the larger string. These concepts are also reflected in FIG. 1.

Additionally, the database can be instructed to ignore common words such as "it", "an", "a", "of", "as", "in", and the like—or any common words when counting association frequencies for words and word-strings. This will more accurately reflect the true association frequency numbers that will otherwise be skewed by the numerous occurrences of common words as part of any given range. This allows the association database creation technique of the present invention to prevent common words from skewing the analysis without excessive subtraction calculations. It should be noted that if these or any other common words are not "subtracted" out of the association database, they would ultimately not be approved as a translation, unless appropriate, because the double overlap process described in more detail herein would not accept it.

It should be noted that other calculations to adjust the association frequencies could be made to insure the accurate reflection of the number of common occurrences of word and word strings. For example, an adjustment to avoid double counting may be appropriate when the ranges of analyzed words overlap. Adjustments are desirable in these cases to build more accurate association frequencies. An example of an embodiment of the method and apparatus for creating and supplementing a cross-idea database according to the present invention will now be described using the two documents described above as an example—the table is re-created as follows:

| Document A (language A) | Document B (language B) |
|---|---|
| X Y Z X W V Y Z X Z | AA BB CC AA EE FF GG CC |

Note once again that although this embodiment focuses on recurring words and word-strings in only a single document, this is mainly for illustrative purposes. Recurring words and word-strings will be analyzed using all available Parallel and Comparable Text in the aggregate.

Using the two documents listed above (A, the first language and B, the second language), the following steps occur for the database creation technique.

Step 1. First, the size and location of the range is determined. As indicated, the size and location may be user defined or may be approximated by a variety of methods. The word count of the two documents is approximately equal (ten words in document A, eight words in document B) therefore we will locate the mid-point of the range to coincide with the location of the word or word string in the document A. (Note: As the ratio of word counts between the documents is 80%, the location of the range alternatively could have been established applying a fraction $4/5$ths). In this example, a range size or value of three may provide the best results to approximate a bell curve; the range will be (+/−) 1 at the beginning and end of the document, and (+/−) 2 in the middle. However, as indicated, the range (or the method used to determine the range) is entirely user defined.

Step 2. Next, the first word in document A is examined and tested against document A to determine the number of occurrences of that word in the document. In this example the first word in document A is X: X occurs three times in document A, at positions 1, 4, and 9. The position numbers of a word or word string are simply the location of that word, or word string in the document relative to other words. Thus, the position numbers correspond to the number of words in a document, ignoring punctuation—for example, if a document has ten words in it, and the word "king" appears twice, the position numbers of the word "king" are merely the places (out of ten words) where the word appears.

Because word X occurs more than once in the document, the process proceeds to the next step. If word X only occurred once, then that word would be skipped and the process continued to the next word and the creation process continued.

Step 3. Possible second language translations for first language word X at position 1 are returned: applying the range to document B yields words at positions 1 and 2 (1+/−1) in document B: AA and BB (located at positions 1 and 2 in document B). All possible combinations are returned as potential translations or relevant associations for X: AA, BB, and AA BB (as a word string combination). Thus, X1 (the first occurrence of word X) returns AA, BB, and AA BB as associations.

Step 4. The next position of word X is analyzed. This word (X2) occurs at position 4. Since position 4 is near the center of the document, the range (as determined above) will be two words on either side of position 4. Possible associations are returned by looking at word 4 in document B and applying the range (+/−)2—hence, two words before word 4 and two words after word 4 are returned. Thus, words at positions 2, 3, 4, 5, and 6 are returned. These positions correspond to words BB, CC, AA, EE, and FF in document B. All forward permutations of these words (and their combined word strings) are considered Thus, X2 returns BB, CC, AA, EE, FF, BB CC, BB CC AA, BB CC AA EE, BB CC AA EE FF, CC AA, CC AA EE, CC AA EE FF, AA EE, AA EE FF, and EE FF as possible associations.

Step 5. The returns of the first occurrence of X (position 1) are compared to the returns of the second occurrence of X (position 4) and matches are determined. Note that returns which include the same word or word string occurring in the overlap of the two ranges should be reduced to a single occurrence. For example, in this example the word at position 2 is BB; this is returned both for the first occurrence of X (when operated on by the range) and the second occurrence of X (when operated on by the range). Because this same word position is returned for both X1 and X2, the word is counted as one occurrence. If, however, the same word is returned in an overlapping range, but from two different word positions, then the word is counted twice and the association frequency is recorded. In this case the returns for word X is AA, since that word (AA) occurs in both association returns for X1 and X2. Note that the other word that occurs in both association returns is BB; however, as described above, since that word is the same position (and hence the same word) reached by the operation of the range on the first and second occurrences of X, the word can be disregarded.

Step 6. The next position of word X (position 9) (X3) is analyzed. Applying a range of (+/−) 1 (near the end of the document) returns associations at positions 8, 9 and 10 of document B. Since document B has only 8 positions, the results are truncated and only word position 8 is returned as possible values for X: CC. (Note: alternatively, user defined parameters could have called for a minimum of two characters as part of the analysis that would have returned position 8 and the next closest position (which is GG in position 7)).

Comparing X3's returns to X1's returns reveals no matches and thus no associations.

Step 7. The next position of word X is analyzed; however, there are no more occurrences of word X in document A. At this point an association frequency of one (1) is established for word X in Language A, to word AA in Language B.

Step 8. Because no more occurrences of word X occur, the process is incremented by a word and a word string is tested. In this case the word string examined is "X Y", the first two words in document A. The same technique described in steps 2-7 are applied to this phrase.

Step 9. By looking at document A, we see that there is only one occurrence of the word string X Y. At this point the incrementing process stops and no database creation occurs. Because an end-point has been reached, the next word is examined (this process occurs whenever no matches occur for a word string); in this case the word in position 2 of document A is "Y".

Step 10. Applying the process of steps 2-7 for the word "Y" yields the following:

Two occurrences of word Y (positions 2 and 7) exist, so the database creation process continues (again, if Y only occurred once in document A, then Y would not be examined);

The size of the range at position 2 is (+/−) 1 word;

Application of range to document B (position 2, the location of the first occurrence of word Y) returns results at positions 1, 2, and 3 in document B;

The corresponding foreign language words in those returned positions are: AA, BB, and CC;

Applying forward-permutations yields the following possibilities for Y1: AA, BB, CC, AA BB, AA BB CC, and BB CC;

The next position of Y is analyzed (position 7);

The size of the range at position 7 is (+/−) 2 words;

Application of that range to document B (position 7) returns results at positions 5, 6, 7, and 8: EE FF GG and CC;

All permutations yield the following possibilities for Y2: EE, FF, GG, CC, EE FF, EE FF GG, EE FF GG CC, FF GG, FF GG CC, and GG CC;

Matching results from Y1 returns CC as the only match;

Combining matches for Y1 and Y2 yields CC as an association frequency for Y.

Step 11. End of range incrementation: Because the only possible match for word Y (word CC) occurs at the end of the range for the first occurrence of Y (CC occurred at position 3 in document B), the range is incremented by 1 at the first occurrence to return positions 1, 2, 3, and 4: AA, BB, CC, and AA; or the following forward permutations: AA, BB, CC, AA BB, AA BB CC, AA BB CC AA, BB CC, BB CC AA, and CC AA. Applying this result still yields CC as a possible translation for Y. Note that the range was incremented because the returned match was at the end of the range for the first occurrence (the base occurrence for word "Y"); whenever this pattern occurs an end of range incrementation will occur as a sub-step (or alternative step) to ensure completeness.

Step 12. Since no more occurrences of "Y" exist in document A, the analysis increments one word in document A and the word string "Y Z" is examined (the next word after word Y). Incrementing to the next string (Y Z) and repeating the process yields the following:

Word string Y Z occurs twice in document A: position 2 and 7 Possibilities for Y Z at the first occurrence (Y Z1) are AA, BB, CC, AA BB, AA BB CC, BB CC; (Note, alternatively the range parameters could have been defined to include the expansion of the size of the range as word strings being analyzed in language A get longer.)

Possibilities for Y Z at the second occurrence (Y Z2) are EE, FF, GG, CC, EE FF, EE FF GG, EE FF GG CC, FF GG, FF GG CC, and GG CC;

Matches yield CC as a possible association for word string Y Z;

Extending the range (the end of range incrementation) yields the following for Y Z: AA, BB, CC, AA BB, AA BB CC, AA BB CC AA, BB CC, BB CC AA, and CC AA.

Applying the results still yields CC as an association frequency for word string Y Z.

Step 13. Since no more occurrences of "Y Z" exist in document A, the analysis increments one word in document A and the word string "Y Z X" is examined (the next word after word Z at position 3 in document A). Incrementing to the next word string (Y Z X) and repeating the process (Y Z X occurs twice in document A) yields the following:

Returns for first occurrence of Y Z X are at positions 2, 3, 4, and 5;

Permutations are BB, CC, AA, EE, BB CC, BB CC AA, BB CC AA EE, CC AA, CC AA EE, and AA EE;

Returns for second occurrence of Y Z X are at positions 5, 6, 7, and 8;

Permutations are EE, FF, GG, CC, EE FF, EE FF GG, EE FF GG CC, FF GG, FF GG CC, and GG CC.

Comparing the two yields CC as an association frequency for word string Y Z X; again, note that the return of EE as a possible association is disregarded because it occurs in both instances as the same word (i.e., at the same position).

Step 14. Incrementing to the next word string (Y Z X W) finds only one occurrence; therefore the word string database creation is completed and the next word is examined: Z (position 3 in document A).

Step 15. Applying the steps described above for Z, which occurs 3 times in document A, yields the following:

Returns for Z1 are: AA, BB, CC, AA, EE, AA BB, AA BB CC, AA BB CC AA, AA BB CC AA EE, BB CC, BB CC AA, BB CC AA EE, CC AA, CC AA EE, and AA EE;

Returns for Z2 are: FF, GG, CC, FF GG, FF GG CC, and GG CC;

Comparing Z1 and Z2 yields CC as an association frequency for Z; Z3 (position 10) has no returns in the range as defined. However, if we add to the parameters that there must be a least one return for each language A word or word string, the return for Z will be CC.

Comparing the returns for Z3 with Z1 yields CC as an association frequency for word Z. However, this association is not counted because CC in word position 8 was already accounted in Z2's association above. When an overlapping range would cause the process to double count an occurrence, the system can reduce the association frequency to more accurately reflect for the number of true occurrences.

Step 16. Incrementing to the next word string yields the word string Z X, which occurs twice in document A. Applying the steps described above for Z X yields the following:

Returns for Z X1 are: BB, CC, AA, EE, FF, BB CC, BB CC AA, BB CC AA EE, BB CC AA EE FF, CC AA, CC AA EE, CC AA EE FF, AA EE, AA EE FF, and EE FF.

Returns for Z X2 are: FF, GG, CC, FF GG, FF GG CC, and GG CC;

Comparing the returns yields the association between word string Z X and CC.

Step 17. Incrementing, the next phrase is Z X W. This occurs only once, so the next word (X) in document A is examined.

Step 18. Word X has already been examined in the first position. However, the second position of word X, elative to the other document, has not been examined for possible returns for word X. Thus word X (in the second position) is now operated on as in the first occurrence of word X, going forward in the document:

Returns for X at position 4 yield: BB, CC, AA, EE, FF, BB CC, BB CC AA, BB CC AA EE, BB CC AA EE FF, CC AA, CC AA EE, CC AA EE FF, AA EE, AA EE FF, and EE FF.

Returns for X at position 9 yield: CC.

Comparison of the results of position 9 to results for position 4 yields CC as a possible match for word X and it is given an association frequency.

Step 19. Incrementing to the next word string (since, looking forward in the document, no more occurrences of X occur for comparison to the second occurrence of X) yields the word string XW. However, this word string does not occur more than once in document A so the process turns to examine the next word (W). Word "W" only occurs once in document A, so incrementation occurs—not to the next word string, since word "W" only occurred once, but to the next word in document A—"V". Word "V" only occurs once in document A, so the next word (Y) is examined. Word "Y" does not occur in any other positions higher than position 7 in document A, so next word (Z) is examined. Word "Z" occurs again after position 8, at position 10.

Step 20. Applying the process described above for the second occurrence of word Z yields the following:

Returns for Z at position 8 yields: GG, CC, and GG CC;

Returns for Z at position 10 yields: CC;

Comparing results of position 10 to position 8 yields no associations for word Z.

Again, word CC is returned as a possible association; however, since CC represents the same word position reached by analyzing Z at position 8 and Z at position 10, the association is disregarded.

Step 21. Incrementing by one word yields the word string Z X; this word string does not occur in any more (forward) positions in document A, so the process begins anew at the next word in document A—"X". Word X does not occur in any more (forward) positions of document A, so the process begins anew. However, the end of document A has been reached and the analysis stops.

Step 22. The final association frequency is tabulated combining all the results from above and subtracting out duplications as explained.

There may be insufficient data to return conclusive results for words and word-strings in document A. However, as more document pairs are examined containing words and word strings with those associations examined above, the association frequencies will become statistically more reliable such that words or word strings between Languages A and B will build strong associations for possible translations of words and word-strings.

An example of an embodiment of the database creation method, operating in conjunction with a computer system of the type known in the art, is set forth in Appendix A.

As demonstrated, this embodiment is representative of the technique used to create associations. The techniques of the present invention need not be limited to language translation. In a broad sense, the techniques will apply to any two expressions of the same idea that may be associated, for at its essence foreign language translation merely exists as a paired associations of the same idea represented by different words or word strings. Thus, the present invention may be applied to associating data, sound, music, video, or any wide ranging concept that exists as an idea, including ideas that can represent any sensory (sound, sight, smell, etc.) experiences. All that is required is that the present invention analyzes two embodiments (in language translation, the embodiments are documents; for music, the embodiments might be digital representations of a music score and sound frequencies denoting the same composition, and the like).

In another embodiment, certain rule-based algorithms, well known in the art, can be incorporated into the cross-language association learning to treat certain classes of text that are, for purposes of context and meaning, interchangeable (and sometimes can have potentially infinite derivations) such as names, numbers and dates.

In addition, if available cross-language documents do not furnish statistically significant results for translation, users can examine the possible choices for translations and other associations and approve and rank appropriate choices.

As described, the association frequencies get stronger between words and word-strings as more documents in translated pairs are analyzed for association frequencies. As documents in more language pairs are examined, the method and apparatus of the present invention will begin filling in "deduced associations" between language pairs based on those languages having a common association with a third language, but not directly with one another. In addition, when translated documents exist in multiple languages, common association returns can be analyzed across several languages until only one common association exists between all, which is the translation.

The following is an example of a computer program that (when operated in conjunction with a computer system of the type known in the art) provides a method where data in these languages is utilized in an embodiment of the present invention:

```
<?
$word = "united nations";
$engspa_t = "engspa";
$engfre_t = "hebfre";
$frespa_t = "frespa";
$c = 1;
MYSQL_CONNECT("128.241.244.166", "root");
$query = "select total, lang, langcount, olang,
olangcount from $engfre_t where
olang = '$word'";
$result = MYSQL ("brain", $query) or
die ("Error #1 –$query –".MYSQL_ERROR());
$query1 = "select lang from $engspa_t where olang = '$word'";
$result1 = MYSQL ("brain", $query1) or die("Error #2 –$query1 –
".MYSQL_ERROR());
for ($i = 0; $i < MYSQL_NUM_ROWS ($result1) ; $i++)
{
    list ($lang) = MYSQL_FETCH_ROW ($result1);
    $in .= ", '".addslashes ($lang). "'";
}
$in = substr ($in, 1);
$num = MYSQL_NUM_ROWS ($result);
print "$in<BR> <BR>∴n";
for ($i = 0 ; $i < $num; $i++)
{
    list ($total, $lang, $langc, $olang, $olangc) =
    MYSQL_FETCH_ROW ($result);
    print "$lang, ";
    $query2 = "select cid from $frespa_t
    where olang = '".addslashes ($lang)."'
and lang in ($in)";
    $result2 = MYSQL ("brain", $query2) or die ("Error #3 –$query2 –
".MYSQL_ERROR());
    if (MYSQL_NUM_ROWS ($result2) >0)
    {
        $res .= "$i –$total, $lang, $langc, $olang, $olangc<BR>∴n";
        $c++;
    }
}
print "<BR><BR>$res";
print "$c / ".MYSQL_NUM_ROWS ($result);
?>
```

Deduced associations can be produced between text in a pair of languages when text in the languages share a common definition in a third language or languages. The text can be a portion or segment of a document to be translated, such as a word or a phrase. For example, if there is insufficient cross-language text to translate directly a Language A phrase "aa dd pz" into a Language B phrase, deducing an association can include comparing this Language A phrase with the phrase's translations in Languages C, D, E, and F, where sufficient cross-language text exists to make these translations, as shown in Table 1. Then, the translations of "aa dd pz" in Languages C, D, E, and F can then be translated into Language B if sufficient cross-language text exists to make these translations, as shown in Table 2. Deducing the association between Language A phrase "aa dd pz" and a phrase in Language B further includes comparing the Language B phrases that have been translated from the Language C, D, E, and F translations of "aa dd pz." Some of the Language B phrases that have been translated from the Language C, D, E, and F translations of "aa dd pz" may be identical and, in this preferred embodiment of the present invention, these will represent the correct Language B translation of the Language A phrase "aa dd pz." As shown in Table 2, Language C, D, and F translations to Language B produce identical Language B phrases, to provide the correct Language B translation, "UyTByM." Thus, a deduced association can be created between the Language A phrase and its correct Language B translation. Language E translation into Language B produces the non-identical Language B phrase ZnVPiO. This may indicate that Language E phrase "153" has more than one meaning or that Language B phrases UyTByM and ZnVPiO are interchangeable.

TABLE 1

| Language A | Language C | Language D | Language E | Language F |
|---|---|---|---|---|
| aa dd pz | A1 d | zyp | 153 | 1AAAA))$ |

TABLE 2

| Language | Translation From Language A "aa dd pz" | Translation To Language B |
|---|---|---|
| Language C | A1 d | UyTByM |
| Language D | zyp | UyTByM |
| Language E | 153 | ZnVPiO |
| Language F | 1AAAA))$ | UyTByM |

In another embodiment, the accuracy of existing translation systems known in the art can be improved by use of the method and apparatus of the present invention described above. Existing translation systems will produce a result from Language A to Language B; this result may be compared to results from the translation (in the systems and apparatus of the prior art) of Language A to other languages (e.g., languages C, D, E, and F) and, subsequently from those translations to Language B using systems and apparatus of the prior art. Using the method and apparatus of the present invention, the resultant common parts of the translations among the different Language B translation results can be compared to produce a more accurate translation. As long as each segment of the translation query has a minimum user defined number (at least two) of the same results translated into Language B, the entire phrase may be translated in an accurate manner. If any portion of a translation is not verified by the user defined minimum number of different translations into the target language, the unresolved portions may be highlighted for the user. Thus, by using multilingual leverage with different translation engine language pairs, the accuracy of the end product can be improved dramatically, and portions still unresolved can be specifically identified.

An example of an embodiment of the present invention and its use of any set of translation engines is as follows (In this example, the phrase to be translated is the phrase "zz pd lz nz ki xo," from Language A into Language B):

First, the present invention translates the phrase directly from Language A to Language B using the any existing translation system, and the result stored for later manipulation.

Second, the present invention translates the phrase in Language A to other languages (for the purposes of this example, languages C, D, E, and F are utilized). Thus, using existing translation systems, the known phrase in Language A is translated to Language C, the known phrase in Language A is translated to Language D, the known phrase in Language A is translated to Language E, and the known phrase in Language A is translated to Language F. Different translation systems and methods may be used for the different language translations; i.e. the same translation device or system does not have to be used consistently for the translations from Language A to Languages B, C, D, E, and F. The results of each of these translations from Language A are stored for later manipulation.

Third, the results from the operations above are utilized to translate the phrase from languages—in this embodiment languages C, D, E and F—to Language B. Using existing translation devices and systems of the prior art, the resultant translation for the phrase in Language C (i.e., the result of the translation from Language A to Language C obtained and stored as described herein) is translated to Language B using a translation system or device known in the art. Again, in the present invention it is not necessary to utilize the identical known prior art translation system used to translate the phrase from Language A to Language C to likewise translate the resultant phrase in Language C to Language B. For example, the translation of the phrase from Language A to Language C could be performed using translation device X, while the translation of the phrase from Language C (resulting from using device X) to Language B may be performed using translation device Y. The resultant translation (from Language C to Language B) is stored for later manipulation.

The process continues with the results from the Language A translations of the phrase applied to other languages to create Language B translations of the phrase. Thus, using existing translation devices and systems of the prior art, the resultant translation for the phrase in Language D (i.e., the result of the translation from Language A to Language D obtained and stored as described herein) is translated to Language B using a translation system or device known in the art; the resultant translation for the phrase in Language E obtained and stored from the operations described above are translated to Language B, and finally the resultant translation for the phrase in Language F obtained and stored from the operations described above are translated to Language B.

The above steps are shown in the following Table 3 and Table 4 to translate the phrase "zz pd lz nz ki xo" from Language A (known) to Language B (target) using known translation systems of different languages:

TABLE 3

| Language | Translation From Language A "zz pd lz nz ki xo" |
| --- | --- |
| Language B (direct translation) | ZwI NwQ PzO KrL IoR |
| Language C (using prior art translation) | K4 e R5 e Fn2 |
| Language D (using prior art translation) | dojmke |
| Language E (using prior art translation) | 140967 |
| Language F (using prior art translation) | 14YYY()% |

TABLE 4

| Translation from Languages | Translation To Language B |
| --- | --- |
| Language A (direct translation) | ZwI NwQ PzO KrL IoR |
| Language C (using prior art translation and result from earlier translation from Language A) | ZwI LoL PzO KrL PdL |
| Language D (using prior art translation and result from earlier translation from Language A) | ZwI LoL PzO BoR ZnL |
| Language E (using prior art translation and result from earlier translation from Language A) | ToU PkP PzO KrL TbK |
| Language F (using prior art translation and result from earlier translation from Language A) | ZwI LoL TnQ DiB IoR |

Comparing the results of the direct Language B translation and the four indirect Language B translations, the segments that have more than one occurrence across the translations have a high degree of certainty that they are accurate. Each 1 common translation result above two gives even higher certainty to the accuracy of the results:

"ZwI" is verified by translations from A directly, C, D, and F

"LoL" is verified by translations from C, D, and F

"PzO" is verified by translations from A directly, C, D, and E

"KrL" is verified by translations from A directly, C and E

"IoR" is verified by translations from A directly and F

Using the process described above produces the result resulting translation that would be "ZwI LoL PzO KrL IoR". The number of languages used for multilingual leverage as applied to other translation engines is user defined. The more indirect translations through other languages used to verify correct translations of a word string or any other data segment, the more statistically certain that the present invention will produce an accurate translation. In addition, in another embodiment when comparing between translations from a variety of languages, a thesaurus may be added to the system to see if any of the unmatched segments are synonymous, in which case one of the synonyms can be approved or highlighted as a synonym match.

If expressions in existing states are artificially attributed specific associations with data points in another state and catalogued in a database, conversions between those two states will be possible. For example, if each "idea" represented in a form, state, or language is assigned an association to an electromagnetic wave (tone), it will create an "electromagnetic representation" of the idea. Once a given number of ideas have been encoded with corresponding electromagnetic representations, data (in the form of an idea) can be translated into electromagnetic waves and transferred at once over conventional telecommunications infrastructure. When the electromagnetic waves reach the destination machine, that machine will synthesize the waves into separate components and, given the associations (along with ordering instructions, use of the double overlap technique as described herein, and/ or other possible methods), present the individual ideas that were represented by the electromagnetic representations.

2. Idea Conversion Method and Apparatus

Another aspect of the present invention is directed to providing a method and apparatus for creating a second document comprising data in a second state, form, or language, from a first document comprising data in a first state, form, or language, with the end result that the first and second documents represent substantially the same ideas or information, and wherein the method and apparatus includes using a cross-idea association database. All embodiments of the translation method utilize a double-overlap technique to obtain an accurate translation of ideas from one state to another. In contrast, prior art translation devices focus on individual word translation or utilize special rule-based codes to facilitate the translation from a first language into a second language. The present invention, using the overlap technique, enables words and word strings in a second language to be connected together organically and become accurate translations in their correct context in the exact manner those words and phrases would have been written in the second language.

In an embodiment of the present invention, the method for database creation and the overlap technique are combined to provide accurate language translation. The languages can be any type of conversion and are not necessarily limited to spoken/written languages. For example, the conversion can encompass computer languages, specific data codes such as ASCII, and the like. The database is dynamic; i.e., the database grows as content is input into the translation system, with successive iterations of the translation system using content entered at a previous time. The preferred embodiment of the invention utilizes a computing device such as a personal computer system of the type readily available in the prior art. However, the system does not need to use such a computing device and can readily be accomplished by other means, including manual creation of the database and translation methods.

The present invention may be utilized on a common computer system having at least a display means, an input method, and output method, and a processor. The display means can be any of those readily available in the prior art, such as cathode ray terminals, liquid crystal displays, flat panel displays, and the like. The processor means also can be any of those readily available and used in a computing environment such that the means is supplied to allow the computer to operate to perform the present invention. Finally, an input method is utilized to allow the input of the documents for the purposes of building the cross-association database; as described above the specific input method for conversion to digital form can vary depending on the needs of the user.

a. Manual Database Creation and Translation Through Double-Overlap Technique

An example of an embodiment of the method and apparatus for translating a document from a first language into a second language according to the present invention, where the cross language database is developed by querying the user for translations of words and word strings, as well as automatically generating segment translations using the double overlap technique, will now be described.

For the purposes of describing the preferred embodiment, an example will be used wherein data in the English language is translated to data in the Hebrew language. These selections are for descriptive purposes only and are not meant to limit the selection of a first and second language.

According to a preferred embodiment of the present invention, the computer system operates to create a database of associations between translations from English to Hebrew. The translation method encompasses at least the following steps:

First, Data in the English Language is Input into the Computer System.

Second, all words of the English language input are first examined on a word by word basis. The database will return known word translations in Hebrew. If the translation is not included in the database, then the computer system will operate in a manner to query the user to input the appropriate translation. Thus, if the database does not know the Hebrew equivalent to an input English word, the computer will ask the user to provide the appropriate Hebrew equivalent. The user will then return the translation and input said translation into the database. Upon subsequent use, the computer system will operate the database in a manner such that the translation is known by virtue of its input by the user at an earlier point in time. Thus, in a second step the input data is examined in its parsed state—e.g., word for word—and the appropriate translations are either returned (by virtue of the operation of the database) or entered into the database.

Third, the input data is examined in a manner so as to increment the parsed segments. For example, if the data was first parsed on a word-by-word basis, the translation method of the present invention next examines the input data by evaluating two word-strings. Again, in a manner similar to that described above, the database returns translations for the two-word strings if known; if unknown the translation system operates to query the user to input the appropriate translation for all possible two word strings. All overlapping 2 word segments are then stored in the database. For example, if a word string is comprised of four words, then the database checks to see if it has the following combinations translated in memory: 1,2 2,3 and 3,4. If not, it queries the user. Note that only specifically encoded translations for the two word strings will be returned as accurate translations, even though the database will necessarily contain each word definition by virtue of the second step above.

Fourth, if the Hebrew translations of two overlapping two-word English language strings have an overlapping word (or words), the system operates in a manner to combine the overlapped segments. Redundant Hebrew segments in the overlap are eliminated to provide a coherent translation of the three-word English language string that is created by combining the two overlapping English language strings (and eliminating redundancies in the English language overlap). The above steps are reiterated out from 1 to an infinite number of steps (n) so as to provide the appropriate translation. The translation method works automatically by verifying consistent strings that bridge encoded word-blocks in both languages through the overlap. These automatic approvals for overlap-bridges that are consistent across both languages provide a language network that translates between two languages with perfect accuracy once the database reaches critical mass.

As an example, consider the English language phrase "I want to buy a car." Upon operation of a method of the present invention, this phrase will be input into a computer operating a database. The computer will operate to determine if the database includes Hebrew equivalents to the following words: "I", "want", "to", "buy", "a", and "car". If such equivalents are known, the computer will return the Hebrew equivalents. If such equivalents are not known, the computer will query the user to provide the appropriate Hebrew translations, and store such translations for future use. Next, the computer will parse the sentence into two word segments in an overlapping manner: "I want", "want to", "to buy", "buy a"

and "a car". The computer will operate to return the Hebrew equivalents of these segments (i.e., the Hebrew equivalent of "I want" etc.); if such Hebrew equivalents are not known then the computer will query the user to provide the appropriate Hebrew translations, and store such translations for future use.

The present invention will next examine three-word segments "I want to", "want to buy", "to buy a", and "buy a car". At this point in the process the present invention attempts to combine each pair of Hebrew translations whose two-word English translations overlap and combine to make each three-word English translation query (e.g., "I want" and "want to" combine to form "I want to"). If the Hebrew segments have a common overlap that connects them as well, the translation method automatically approves the three-word English word string to Hebrew as a translation without any user intervention. If the Hebrew segments do not overlap and combine, the user is queried for an accurate translation. After the appropriate translation attempts for three word English strings, the process proceeds with four-word strings, and so on, attempting to automatically resolve, through the cross-language overlap, combinations of translations until the segment being examined is complete (in this case, the entire phrase "I want to buy a car"). The method of the present invention, after going through this parsing, then compares the returned translation equivalents, eliminates redundancies in the overlapped segments, and outputs the translated phrase to the user.

b. Document Translation Through Association Database and Double Overlap Technique As another preferred embodiment, the present invention can translate a document in a first language into a document in a second language by using a cross-language database as described above to provide word-string translations of words and word-strings in the document, and then combine overlapping word-strings in the second language to provide the translation of the document, using the cross-language double-overlap technique described above. For example, consider a database with access to enough cross-language documents to resolve the components of the following sentence entered in English and intended to be translated into Hebrew: "In addition to my need to be loved by all the girls in town, I always wanted to be known as the best player to ever play on the New York state basketball team."

Through the process described above, the manipulation method might determine that the phrase "In addition to my need to be loved by all the girls" is the largest word-string from the source document beginning with the first word of the source document and existing in the database. It is associated in the database to the Hebrew word string "benosaf ltzorech sheli lihiot ahuv al yeday kol habahurot."The process will then determine the following translations using the method described above—i.e. the largest English word string from the text to be translated (and exists in the database) with one word (or alternatively more words) that overlap with the previously identified English word string, and the two Hebrew language translations for those overlapping English language word strings have overlapping segments as well: "loved by all the girls in town" translates to "ahuv al yeday kol habahurot buir"; "the girls in town, I always wanted to be known" translates to "Habahurot buir, tamid ratzity lihiot yahua"; "I always wanted to be known as the best player" translates to "tamid ratzity lihiot yahua bettor hasahkan hachi tov"; and "the best player to ever play on the New York state basketball team" translates to "hasahkan hachi tov sh hay paam sihek bekvutzat hakadursal shel medinat new york".

With these returns by the database, the manipulation will operate in a manner to compare overlapping word and word strings and eliminate redundancies. Thus, "In addition to my need to be loved by all the girls" translates to "benosaf ltzorech sheli lihiot ahuv al yeday kol habahurot"; and "loved by all the girls in town" translates to "ahuv al yeday kol habahurot buir". Utilizing the technique of the present invention, the system will take the English segments "In addition to my need to be loved by all the girls" and "loved by all the girls in town" and will return the Hebrew segments "benosaf ltzorech sheli lihiot ahuv al yeday kol habahurot" and "ahuv al yeday kol habahurot buir" and determine the overlap.

In English, the phrases are: "In addition to my need to be loved by all the girls" and "loved by all the girls in town". Removing the overlap yields: "In addition to my need to be loved by all the girls in town".

In Hebrew, the phrases are:
"benosaf ltzorech sheli lihiot ahuv al yeday kol habahurot" and "ahuv al yeday kol habahurot buir" Removing the overlap yields: "benosaf ltzorech sheli lihiot ahuv al yeday kol habahurot buir"

The present invention then operates on the next parsed segment to continue the process. In this example, the manipulation process works on the phrase "the girls in town, I always wanted to be known". The system resolves the English segment "In addition to my need to be loved by all the girls in town" and the new English word set "the girls in town, I always wanted to be known". The Hebrew corresponding word sets are "benosaf ltzorech sheli lihiot ahuv al yeday kol habahurot buir" and the Hebrew corresponding word set "habahurot buir, tamid ratzity lihiot yahua". Removing the overlap operates, in English, as follows: "In addition to my need to be loved by all the girls in town" and "the girls in town, I always wanted to be known" to "In addition to my need to be loved by all the girls in town, I always wanted to be known".

In Hebrew, the overlap process operates as follows:
"benosaf ltzorech sheli lihiot ahuv al yeday kol habahurot buir" and "habahurot buir, tamid ratzity lihiot yahua" yields "benosaf ltzorech sheli lihiot ahuv al yeday kol habahurot buir, tamid ratzity lihiot yahua".

The present invention continues this type of operation with the remaining words and word strings in the document to be translated. Thus, in an example of the preferred embodiment, the next English word strings are "In addition to my need to be loved by all the girls in town, I always wanted to be known" and "I always wanted to be known as the best player". Hebrew translations returned by the database for these phrases are: "benosaf ltzorech sheli lihiot ahuv al yeday kol habahurot buir, tamid ratzity lihiot yahua" and "tamid ratzity lihiot yahua bettor hasahkan hachi tov". Removing the English overlap yields: "In addition to my need to be loved by all the girls in town, I always wanted to be known as the best player". Removing the Hebrew overlap yields:
"benosaf ltzorech sheli lihiot ahuv al yeday kol habahurot buir, tamid ratzity lihiot yahua bettor hasahkan hachi tov"

Continuing the process: the next word string is "In addition to my need to be loved by all the girls in town, I always wanted to be known as the best player" and "the best player to ever play on the New York State basketball team". The corresponding Hebrew phrases are "benosaf ltzorech sheli lihiot ahuv al yeday kol habahurot buir, tamid ratzity lihiot yahua bettor hasahkan hachi tov" and "hasahkan hachi tov sh hay paam sihek bekvutzat hakadursal shel medinat new york". Removing the English overlap yields: "In addition to my need to be loved by all the girls in town, I always wanted to be known as the best player to ever play on the New York state basketball team". Removing the Hebrew overlap yields:

"benosaf ltzorech sheli lihiot ahuv al yeday kol habahurot buir, tamid ratzity lihiot yahua bettor hasahkan hachi tov sh hay paam sihek bekvutzat hakadursal shel medinat new york", which is the translation of the text desired to be translated.

Upon the completion of this process, the present invention operates to return the translated final text and output the text.

It should be noted that the returns were the ultimate result of the database returning overlapping associations in accordance with the process described above. The system, through the process, will ultimately not accept a return in the second language that does not have a naturally fitting connection with the contiguous second language segments through an overlap. Had any Hebrew language return not had an exact overlap with a contiguous Hebrew word-string association, it would have been rejected and replaced with a Hebrew word-string association that overlaps with the contiguous Hebrew word-strings.

An example of a preferred embodiment of the present invention utilizes the following computer program, operating in conjunction with a computer system of the type known in the art. (See Appendix B)

The above embodiment combining the use of a cross-language association database and the cross-language double overlap translation technique has other potential applications to improve the quality of existing technologies that attempt to equate information from one state to another, such as voice recognition software, and OCR scanning devices that are known in the art. Both of these technologies can test the results of their systems against the translation methods of the present invention. When a translation does not exist and therefore a mistake is presumed, the user can be alerted and queried or the system can be programmed to look for close alternatives in the database to the un-overlapped translation that will produce an overlapped translation. All returns to the user, of course, would be converted back into the original language.

As will be understood by those skilled in the art, many changes in the apparatus and methods described above may be made by the skilled practitioner without departing from the spirit and scope of the invention.

The invention claimed is:

1. A method for translating a textual document segment in a first language into a textual document segment in a second language comprising the steps of:
   providing language translations between the textual document segment in the first language and textual document segments in each of two or more third languages;
   providing language translations between the textual document segments in each of the two or more third languages and textual document segments in a second language;
   identifying a second language textual document segment that is a translation of at least two third language textual document segments, thereby producing the textual document segment in a second language as the translation of the first language textual document segment.

2. The method of claim 1, further comprising identifying a non-identical textual document segment as interchangeable with a textual document segment by identifying textual document segments of equivalent semantic meaning, and using said non-identical textual document segment in place of the textual document segment.

3. The method of claim 1, wherein at least one of the textual document segments in the second language is a translation provided directly from the textual document segment in the first language.

4. The method of claim 1 further comprising:
   storing in a database the textual document segment in the second language as the translation of the textual document segment in the first language.

5. A computer device including a processor, a memory coupled to the processor, and a program stored in the memory, wherein the computer is configured to execute the program and perform the steps; of:
   providing language translations between a textual document segment in the first language and textual document segments in each of two or more third languages;
   providing language translations between textual document segments in each of the two or more third languages and textual document segments in a second language;
   identifying a second language textual document segment that is a translation of at least two third language textual document segments, thereby producing the textual document segment in a second language as the translation of the first language textual document segment.

6. The computer device of claim 5, further configured to perform the step of identifying a non-identical textual document segment as interchangeable with a textual document segments by identifying textual document segments of equivalent semantic meaning, and using said non-identical textual document segment in place of the textual document segment.

7. The computer device of claim 5, wherein at least one of the textual document segments in the second language is a translation provided directly from the textual document segment in the first language.

8. A computer readable storage medium having stored thereon a program executable by a computer processor for performing the steps of:
   providing language translations between a textual document segment in the first language and textual document segments in each of two or more third languages;
   providing language translations between textual document segments in each of the two or more third languages and textual document segments in a second language;
   identifying a second language textual document segment that is a translation of at least two third language textual document segments, thereby producing the textual document segment in a second language as the translation of the first language textual document segment.

9. The computer readable storage medium of claim 8, wherein at least one of the textual document segments in the second language is a translation provided directly from the textual document segment in the first language.

10. The computer readable storage medium of claim 8, further configured to perform the step of identifying a non-identical textual document segment as interchangeable with a textual document segments by identifying textual document segments of equivalent semantic meaning, and using said non-identical textual document segment in place of the textual document segment.

* * * * *